J. W. STEPHENSON.
RAIL JOINT.
APPLICATION FILED FEB. 11, 1913. RENEWED OCT. 31, 1913.

1,093,158.

Patented Apr. 14, 1914.

3 SHEETS—SHEET 1.

Witnesses:
Raphaël Netter
C. D. Morrill

Inventor
John W. Stephenson
By his Attorney
Clarence Ofe

J. W. STEPHENSON.
RAIL JOINT.
APPLICATION FILED FEB. 11, 1913. RENEWED OCT. 31, 1913.

1,093,158.

Patented Apr. 14, 1914.

3 SHEETS—SHEET 2.

Witnesses:
Raphaël Netter
C. D. Morrill

Inventor
John W. Stephenson
By his Attorney
Clarence D. Kent

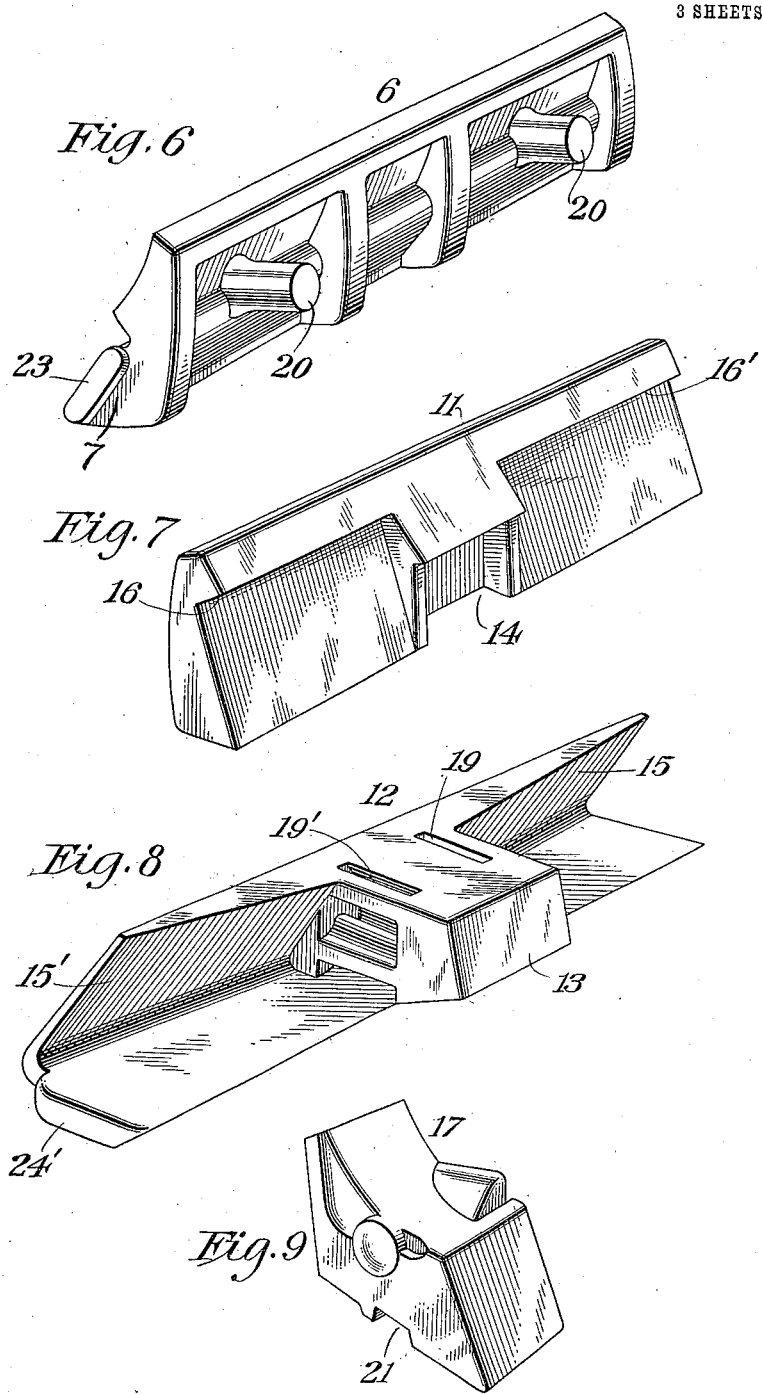

UNITED STATES PATENT OFFICE.

JOHN W. STEPHENSON, OF TOLEDO, OHIO, ASSIGNOR TO THE NATIONAL MALLEABLE CASTINGS COMPANY.

RAIL-JOINT.

1,093,158. Specification of Letters Patent. Patented Apr. 14, 1914.

Application filed February 11, 1913, Serial No. 747,603. Renewed October 31, 1913. Serial No. 798,589.

*To all whom it may concern:*

Be it known that I, JOHN W. STEPHENSON, a citizen of the United States, residing at Toledo, Lucas county, Ohio, have invented new and useful Improvements in Rail-Joints, of which the following is a specification, reference being had to the accompanying drawings, forming a part of the specification, in which—

Figure 1:
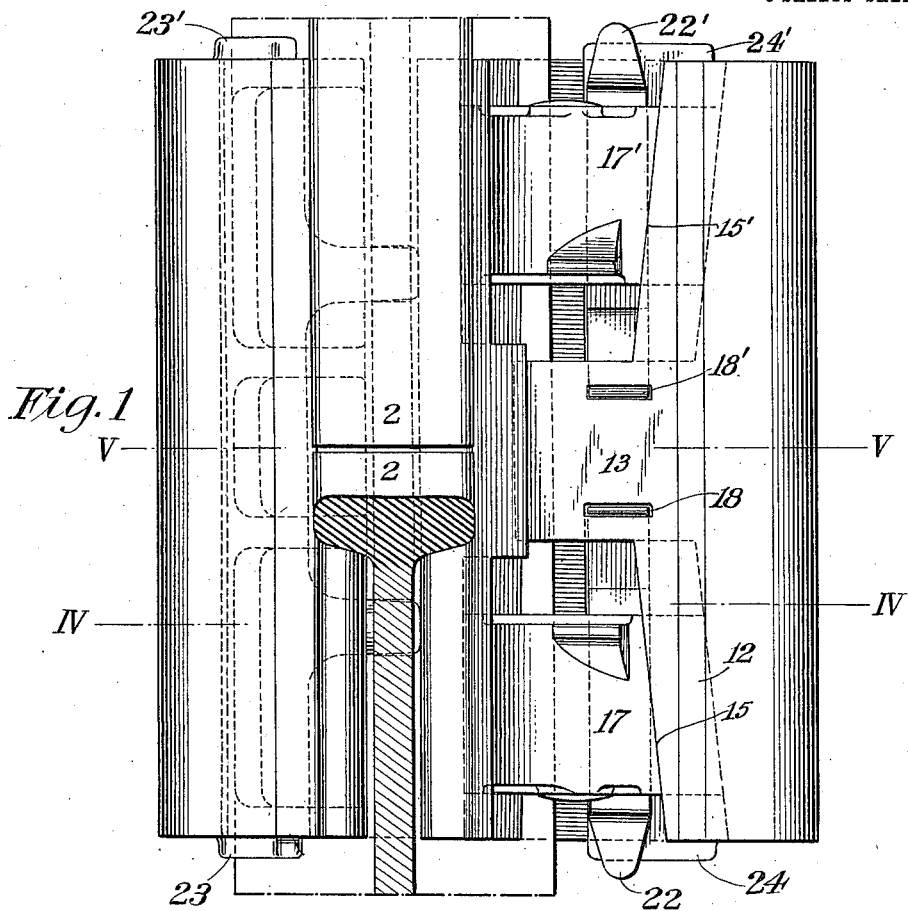
Figure 2:
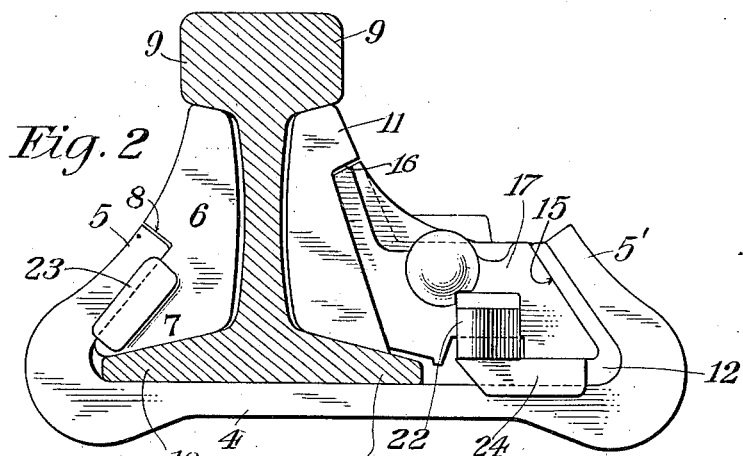
Figure 3:
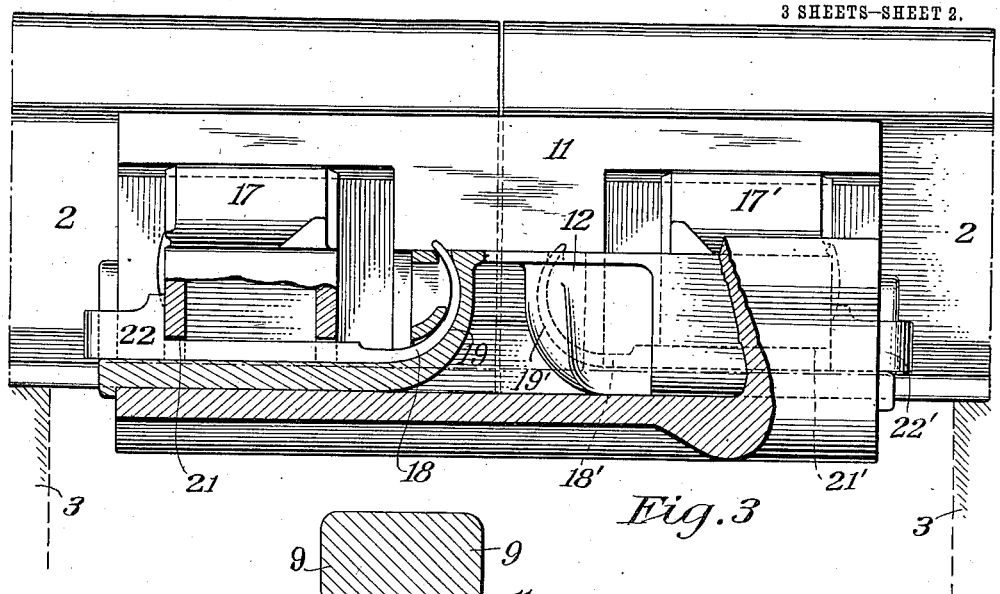
Figure 4:
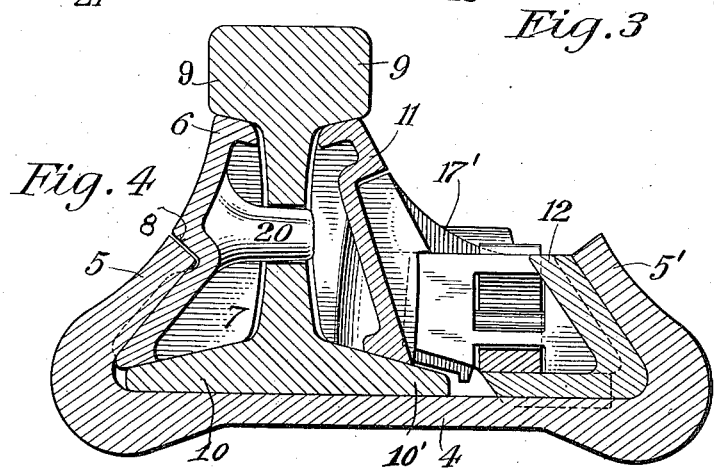
Figure 5:
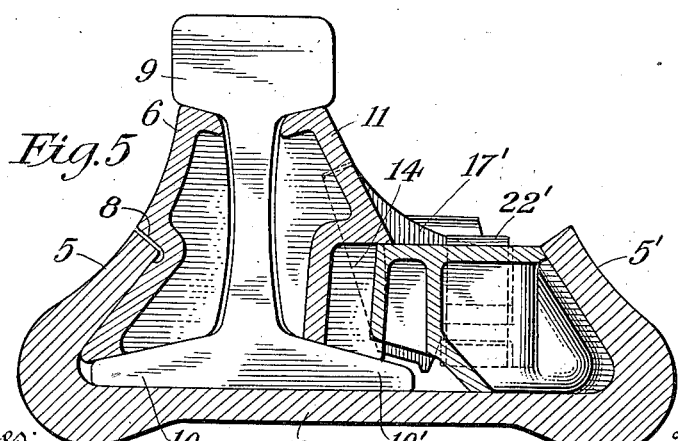

Figure 1 is a plan view of my device; Fig. 2 is an end elevation thereof showing one of the rails in section; Fig. 3 is a side elevation partly in section; Fig. 4 is a section on the lines IV—IV of Fig. 1; Fig. 5 is a section on lines V—V of Fig. 1; Figs. 6 and 7 show details of the rail engaging members; Fig. 8 shows a detail of the guide member, and Fig. 9 a detail of a wedge member.

My invention relates to rail joints and consists in improvements on the rail joint of my application Serial No. 717,233, filed August 27, 1912.

My improvements are comprised in making the joint-plate of such symmetrical shape that it may be readily rolled, in providing rail engaging members separate from the joint plate, and in providing removable parts so that if the wear or strain is excessive upon any of the parts, such parts may be replaced without the necessity of replacing the whole joint.

My device wholly obviates the necessity of using bolts either through the webs of the rails, or of fastening means for securing the rails.

My device also provides an efficient support for the rail heads, and prevents any lateral movement of the rails relative to each other.

Referring to the drawings, 2 designates end portions of adjacent rails, 3 the usual cross ties, and 4 the base or joint plate preferably located between the ties. The joint plate 4 is preferably symmetrical in cross section, is of uniform cross section throughout its length, and has upturned sides 5, 5'. The rail engaging member 6 which extends across the joint, is adapted to have a supporting engagement with the heads 9 of the rails, and its portion 7 extends into the V-shaped space between the flanges 10 of the rails and the upturned side 5 of the plate 4 and bears against the flanges 10 of the rails. The member 6 has a shoulder 8 adapted to overlie the upturned side 5 of the joint plate, and there may be clearance between them if desired, to provide for variation in the rails. The member 6 also has lugs 23, 23' which overlap the ends of the joint plate and prevent relative longitudinal movement of the plate and the rail engaging member. On the opposite side of the rail is the other rail engaging member 11 which also extends across the joint and engages the rails between their flanges 10' and heads 9. The guide-member 12 is located between the upturned side 5' of the joint plate 4 and the flanges 10' of the rails and has lugs 24 24' which overlap the ends of the joint plate to prevent relative longitudinal movement of the guide member and the joint plate. The guide member also has a centrally located projection 13 which extends toward the rails and which is adapted to fit into a socket 14 on the rail engaging member 11 by which it prevents longitudinal movement of the member 11. The inclined inner faces 15 15' of the guide member 12 and the rear faces of the rail engaging member 11, which are provided with shoulders 16 16', form guide-ways for the wedge members 17 17'. The wedge members 17 17' are adapted to be driven into the guide ways between the rail engaging member 11 and the member 12, and to be secured therein by the bendable key members 18 18'. When the ends of the bendable key members 18 18' strike the curved faces of the deflecting channels 19 19' in the projection 13, they are deflected upwardly in such channels and lock the wedges in their positions in the guide-ways.

If desired for the purpose of preventing longitudinal movement of the joint as a whole relative to the rails, bosses 20 may be provided on the rail engaging member suitable for insertion into the bolt holes in the rail webs which are normally used in connection with the ordinary fish plate joint. The wedges 17 17' are provided with slots 21, 21' respectively, for the keys 18 18', and the keys have driving heads 22 22'.

My device is installed as follows: I place the joint plate 4 under the two rails to be joined in such position that it will extend longitudinally to an equal distance each side of the joint. I then insert the rail engaging member 6 with its portion 7 extending into the V-shaped space between the flanges 10 of the rail and the upturned side 5 of the joint plate and with its shoulder 8 overlying the upper edge of said side, on the side opposite the wedges 17, 17'. I next insert the guide member 12 in position against the side 5' of the joint plate and slide the rail engaging member 11 over the projection 13 of the member 12 so that its socket 14 will take about the projection. The wedges 17 17' are driven home in the guideways and the keys 18 18' are then inserted into the slots 21 21' on the under side of the wedges and are driven into the slots as far as the heads 22 22' will permit.

It is obvious that various changes may be made in the construction of the rail joint which I have described and shown herein without departing from my invention.

What I claim is:

1. In a rail joint, a joint-plate having up-turned sides, rail engaging members on opposite sides of the rail extending uninterruptedly across the joint, and adapted to grip the rails between their heads and base flanges, one of said members having a bearing on said joint plate, a plate bearing against one of the sides of the joint-plate, and adapted to form with a rail engaging member a plurality of guideways, wedges for the guideways, and bendable key members for locking the wedges in the guideways.

2. In a rail joint, rail engaging members on opposite sides of the rail extending uninterruptedly across the joint and adapted to grip the rails between their heads and base flanges, a guide member, a guide way formed by a rail engaging member and by the guide member, a wedge operating in the guide way, and a bendable key member adapted to lock the wedge in the guide way.

3. A rail joint comprising a joint plate of substantially uniform cross section throughout its length, rail gripping parts coöperating with the joint plate, wedging means operating between one of the sides of the joint plate and one of the rail gripping parts, and bendable locking means for locking the wedging means against movement.

4. A rail joint comprising a rail joint plate with symmetrically up-turned sides, rail engaging members adapted to engage the rails between their heads and base flanges, one of said members having a shoulder overlying an up-turned side of said joint plate, the other of said members having a projection and socket engagement with a guide member, wedges operating in guide ways between the rail engaging member and the guide member, and bendable means for locking the wedges against movement.

5. A rail joint, comprising a joint-plate, rail gripping parts adapted to bear against the flanges of the rails and to support the rail heads, a plate bearing against the joint plate and adapted to form guideways with the rear face of one of said rail gripping parts, wedges for said guideways and bendable locking means for locking wedges in the guideways.

6. A rail joint comprising a joint-plate, rail gripping parts adapted to bear against the flanges of the rails and to support the rail heads, a plate having bearings against the joint-plate and one of said rail-gripping parts, and being adapted to hold the said rail gripping part against movement longitudinally of the joint-plate, wedging means coöperating with said rail gripping part and said plate, and bendable locking means for locking the wedging means against movement.

7. A rail joint comprising a joint plate of substantially uniform cross-section throughout its length, rail gripping parts coöperating with the joint plate, wedging means operating between one of the sides of the joint plate and one of the rail gripping parts, bendable locking means for locking the wedging means against movement relative to the rail gripping part, and means for preventing movement of a rail gripping part relative to the plate.

JOHN W. STEPHENSON.

Witnesses:
 FRED. W. ALLEN,
 ROBERT E. CHAMBERLAIN.